United States Patent
Yamamoto et al.

(10) Patent No.: US 7,325,418 B2
(45) Date of Patent: Feb. 5, 2008

(54) PRESS FORMING SYSTEM FOR GLASS

(75) Inventors: Yasuo Yamamoto, Numazu (JP); Isao Matsuzuki, Numazu (JP); Hiroshi Murakoshi, Shizuoka-ken (JP); Hirotaka Masaki, Mishima (JP)

(73) Assignee: Toshiba Machine Co., Ltd., Tokyo (JP)

( * ) Notice: Subject to any disclaimer, the term of this patent is extended or adjusted under 35 U.S.C. 154(b) by 549 days.

(21) Appl. No.: 10/434,077

(22) Filed: May 9, 2003

(65) Prior Publication Data
US 2003/0209036 A1    Nov. 13, 2003

(30) Foreign Application Priority Data
May 10, 2002   (JP) ............................. 2002-135320

(51) Int. Cl.
*C03B 35/04* (2006.01)
(52) U.S. Cl. .............................. 65/260; 65/240; 65/241
(58) Field of Classification Search ................ 425/444; 65/240–241, 260
See application file for complete search history.

(56) References Cited

U.S. PATENT DOCUMENTS 5,160,362 A * 11/1992 Yamamoto et al. ............ 65/102
5,269,978 A * 12/1993 Umetsu et al. ............. 264/1.36
5,344,476 A *  9/1994 Tomida ......................... 65/102
5,403,370 A *  4/1995 Morikita ....................... 65/286
5,417,730 A *  5/1995 Shigyo et al. ................. 65/111
5,616,161 A *  4/1997 Morikita ....................... 65/157
6,176,669 B1 * 1/2001 Lust et al. ............. 414/226.01
6,823,695 B2 * 11/2004 Fukuyama et al. ........... 65/246

FOREIGN PATENT DOCUMENTS

JP    2002-293551    10/2002

* cited by examiner

*Primary Examiner*—Carlos Lopez
(74) *Attorney, Agent, or Firm*—Pillsbury Winthrop Shaw Pittman, LLP

(57) ABSTRACT

The present invention is directed to reduce the total footprint of a press forming system for glass having a plurality of press units, and also to increase an actual availability of each press unit. A plurality of press units are arranged in two parallel rows and a first transfer robot is arranged at the center of the space between the two rows. In adjacent of the moving area of the first transfer robot, a palette changer is arranged. A tray in use is mounted on a first base of the palette changer and a stand-by tray before use is placed on a second base. Blanks and formed products are stored in the tray. Press units equipped with second transfer robots, respectively. In front of the press units, intermediate transfer points are respectively provided for temporarily storing a blank and a formed product.

4 Claims, 1 Drawing Sheet

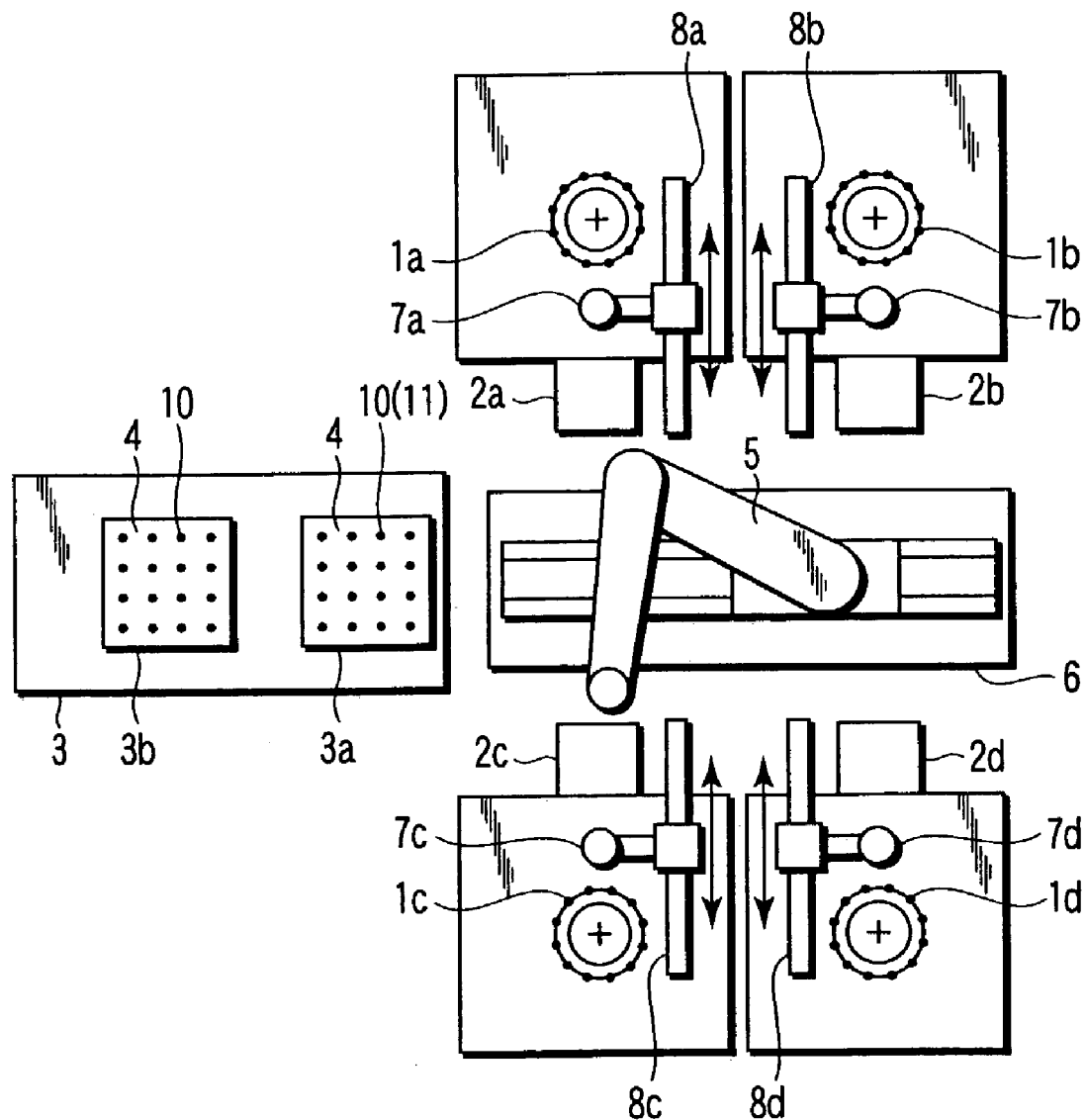
FIGURE

PRESS FORMING SYSTEM FOR GLASS

CROSS-REFERENCE TO RELATED APPLICATIONS

This application is based upon and claims the benefit of priority from the prior Japanese Patent Application No. 2002-135320, filed May 10, 2002, the entire contents of which are incorporated herein by reference.

BACKGROUND OF THE INVENTION

1. Field of the Invention

The present invention relates to a press forming system for glass products such as optical lenses. The present invention is more particularly concerned with a structure of a transferring device for loading blanks and unloading formed products into and from the press forming system having a plurality of press units.

2. Description of the Related Art

Optical glass elements such as optical lenses are formed also by press forming other than polishing and grinding. In the press forming apparatus for glass, a blank of glass is placed between a pair of dies, heated to a temperature above the glass transition point, and press-formed by use of the dies, thereby transferring the pattern of the dies to the blank to form a product.

In the press forming apparatus for glass, a product is formed through a relatively long process comprising steps of placing a blank in dies, heating, press forming, cooling, opening the dies, and taking out a formed product from the dies. Therefore, to ensure the productivity, a plurality of press units is usually arranged in parallel. In such a case, a transfer machine for loading a blank and unloading a formed product is usually provided in every press unit. However, if the system is constructed as mentioned above, the footprint of the entire system will be increased.

In order to save the footprint, attempts were made to develop a press forming system for glass having a single transfer machine commonly used for gaining access to a plurality of press units. In this system, if there are a plurality of press units waiting for the same step to exchange a formed product for a new blank, other press units except one unit in which the exchanging step is first initiated, are put on standby. As a result, an actual availability of the entire system deteriorates.

BRIEF SUMMARY OF THE INVENTION

The present invention has been attained with the view toward solving problems associated with a conventional press forming system for glass.

An object of the present invention is to reduce the total footprint of a press forming system for glass having a plurality of press units, and also to eliminate the stand-by time of individual units.

A press forming system for glass comprises a plurality of press units;

an intermediate transfer point provided at each press unit, which temporarily stores a blank to be supplied to each press unit and a formed product taken out from each press unit;

a storage area, which stores blanks to be supplied to the intermediate transfer points and formed products taken out from the intermediate transfer points;

a first transfer unit, which supplies a blank from the storage area to each intermediate transfer point, and takes out a formed product from each intermediate transfer point to the storage area; and is a second transfer unit, which is provided in each press unit and supplies a blank from the corresponding intermediate transfer point to each press unit and transfers a formed product from each press unit to the corresponding intermediate transfer point.

The steps of press forming of glass in the system according to the present invention will be explained.

Blanks are first loaded into the storage area from the outside of the system. After the blanks are put on stand-by for a while at the storage area, one of the blanks is transferred from the storage area to each intermediate transfer point by the first transfer unit in accordance with the timing at which an operation cycle proceeds to the next operation cycle in each press unit. Subsequently, the blank is picked up by a second transfer unit from the intermediate transfer point and set at a press unit. A product formed in the press unit is picked up by the second transfer unit, and transferred from the press unit to the intermediate transfer point, and then, transferred by the first transfer unit from the intermediate transfer point to the storage area. Thereafter, the formed products thus collected are unloaded out of the system.

If the next blank is loaded in each intermediate transfer point in advance before a press forming step is completed in each of press units, the second transfer unit can transfer the blank to initiate the next operation cycle immediately after the formed product is transferred from the press unit to the intermediate transfer point. Furthermore, the transfer of the formed product from the intermediate transfer point to the storage area and the transfer of a blank from the storage area to the intermediate transfer point can be performed by the first transfer unit while a press forming step is performed in each press unit. The timing at which an operation cycle proceeds to the next operation cycle in a press unit is not affected by the operation step being carried out in other press units arranged in parallel.

BRIEF DESCRIPTION OF THE SEVERAL VIEWS OF THE DRAWING

The single FIGURE shows a schematic view of a press forming system for glass according to the present invention.

DETAILED DESCRIPTION OF THE INVENTION

FIGURE shows a schematic view of a press forming system for glass according to the present invention. In the FIGURE, reference numerals 1a to 1d denote press units, 2a to 2d intermediate transfer points, 3 a palette changer (storage area), 4 a tray, 5 a first transfer robot (first transfer unit), and 7a to 7d second transfer robots (second transfer units).

In this embodiment, the press forming system for glass is composed of four press units 1a to 1d, which are divided into two rows arranged in parallel each other. At the center of the space between the two rows, the first transfer robot is arranged. The first transfer robot 5 has a rotatable arm, on the tip of which a vacuum chuck is provided for holding a blank or a formed product. The first transfer robot 5 is supported on the linear-motion guide 6 and moves in parallel to the two rows.

In adjacent to an end (leftward end) of the linear-motion guide 6, a palette changer 3 is arranged. On the palette changer 3, first and second bases 3a, 3b are provided for mounting a tray 4 thereon. The tray 4 is used for storing blanks 10 and formed products 11. The tray 4 in use is placed on the first base 3a, whereas the stand-by tray 4 before use is placed on the second base 3b.

Corresponding to the press units 1a to 1d, second transfer robots 7a to 7d are respectively arranged. Each of the second transfer robots 7a to 7d has an arm, on the tip of which a vacuum chuck is provided for holding a blank or a formed product. The second transfer robots 7a to 7d are supported respectively on the linier guides 8a to 8d and moved in the direction perpendicular to the aforementioned two rows. In front of the press units 1a to 1d, intermediate transfer points 2a to 2d are respectively provided so as to face the first transfer robot 5. The intermediate transfer points are used for temporarily storing a blank and a formed product.

Now, the steps of forming a glass product in the press forming system for glass will be explained.

First, the tray 4 having a plurality of blanks 10 placed therein is loaded from the outside of the system into the palette changer 3 and placed on the second base 3b. Thereafter, when all blanks 10 in the tray 4 on the first base 3a are consumed, (in other words, all blanks 10 in the tray 4 on the first base 3a are replaced by formed products 11), the tray 4 is removed from the first base 3a and unloaded from the system. Subsequently, the tray 4 put on stand-by on the second base 3b is transferred onto the first base 3a.

A blank 10 is transferred by the first transfer robot 5 from the tray 4 on the first base 3a to each of the intermediate transfer points 2a to 2d in accordance with the timing at which an operation cycle proceeds to the next operation cycle in each of the press units 1a to 1d (described later). Subsequently, the blank is picked up by each of the second transfer robots 7a to 7d and placed at respective the press unit 1a to 1d. After completion of press forming in the press units 1a to 1d, a formed product is taken out from each of the press units 1a to 1d by the respective second transfer robot 7a to 7d and placed on the intermediate transfer points 2a to 2d, respectively. The formed product is then transferred by the first transfer robot 5 from each of the intermediate transfer points 2a to 2d into the tray 4 on the first base 3a. After all blanks 10 in the tray 4 on the first base 3a are replaced by formed products 11, the tray 4 is removed from the first base 3a and unloaded from the system.

If the next blank is loaded by the first transfer robot 5 to each of the intermediate transfer points 2a to 2d in advance before a press forming step is completed in each of the press units 1a to 1d, the second transfer robots 7a to 7d can exchange the formed product for the blank to initiate the next operation cycle immediately after the press forming step is completed in each of the press units 1a to 1d. Furthermore, the transfer of a formed product from the intermediate transfer points 2a to 2d into the tray 4 and the transfer of a blank from the tray 4 to the intermediate transfer points 2a to 2d may be sequentially performed by the first transfer robot 5 while the press forming process is carried out in each of the press units 1a to 1d. Therefore, the timing at which an operation cycle proceeds to the next operation cycle in the press units 1a to 1d is not affected by the operation step being carried out in other press units arranged in parallel.

According to the press forming system for glass of the present invention, the transfer of a blank and a formed product between the storage area and each of the intermediate transfer points can be performed by a single transfer machine, namely, the first transfer unit. By virtue of this, the footprint of the entire system can be reduced. Since the second transfer unit provided for each press unit is responsible for transferring a blank and a formed product only between a press unit and an intermediate transfer point, the moving distance of the second transfer unit is short. Therefore, it is not difficult to suppress the increase in footprint due to the presence of the second transfer units to a minimum.

The timing at which an operation cycle goes to the next operation cycle is not affected by the operation step being carried out in other press units arranged in parallel. As a result, the stand-by time of individual press units can be eliminated and therefore the system can be operated with a high productivity as a whole.

What is claimed is:

1. A press forming system for glass comprising:
   a plurality of press units;
   an intermediate transfer point provided at each press unit, each intermediate transfer point configured to temporarily store a blank to be supplied to a corresponding press unit and a formed product taken out from the corresponding press unit at the same time;
   a single storage area, which stores blanks to be supplied to the intermediate transfer points and formed products taken out from the intermediate transfer points;
   a single first transfer unit, which supplies a blank from the single storage area to each intermediate transfer point, and takes out a formed product from each intermediate transfer point and transfers the formed product to the single storage area; and
   a plurality of second transfer units, each of the plurality of second transfer units being provided in a corresponding press unit and configured to supply a blank from a corresponding intermediate transfer point to the corresponding press unit and configured to transfer a formed product from the corresponding press unit to the corresponding intermediate transfer point, the plurality of second transfer units being configured to operate independently from one another.

2. A press forming system according to claim 1, wherein:
   said press units are arranged in a row or rows; and
   said single first transfer unit is a transfer robot which moves in parallel to the row or rows.

3. A press forming system according to claim 1, wherein the single storage area is adapted to simultaneously store blanks to be supplied to the intermediate transfer points and formed products taken out from the intermediate transfer points.

4. A press forming system according to claim 1, wherein the single storage area is configured to store the blanks and the formed products at the same time.

* * * * *